United States Patent
Peker et al.

(10) Patent No.: US 12,470,083 B2
(45) Date of Patent: Nov. 11, 2025

(54) POWERED DEVICE INTERFACE CONTROLLER

(71) Applicant: MICROCHIP TECHNOLOGY INCORPORATED, Chandler, AZ (US)

(72) Inventors: Arkadiy Peker, Glen Cove, NY (US); Yair Darshan, Petach Tokva (IL); Miguel Jacubovski, Hod Hasharon (IL)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 37 days.

(21) Appl. No.: 18/404,554

(22) Filed: Jan. 4, 2024

(65) Prior Publication Data
US 2025/0023382 A1 Jan. 16, 2025

Related U.S. Application Data

(60) Provisional application No. 63/525,815, filed on Jul. 10, 2023.

(51) Int. Cl.
*H02M 3/04* (2006.01)
*H02J 9/06* (2006.01)

(52) U.S. Cl.
CPC ............... *H02J 9/06* (2013.01); *H02M 3/04* (2013.01)

(58) Field of Classification Search
CPC ............ H02J 9/06; H02M 3/04; H02M 1/007; H02M 7/06
See application file for complete search history.

(56) References Cited

U.S. PATENT DOCUMENTS

9,488,997 B1 11/2016 Dwelley et al.
2009/0243565 A1 10/2009 Darshan

FOREIGN PATENT DOCUMENTS

CN 109361522 A 2/2019

OTHER PUBLICATIONS

"Implementing Auxiliary Power in PoE", Microchip Technology Inc., 2020, pp. 1-14.
"LM5073 100V Power Over Ethernet PD Interface with Aux Support", Texas Instruments, Apr. 2013, pp. 1-28.
"Amendment 2: Physical Layer and Management Parameters for Power over Ethernet over 4 Pairs", LAN/MAN Standards Committee of the IEEE Computer Society, Sep. 2018, pp. 1-291.
International Search Report and the Written Opinion of the International Searching Authority, PCT/US2024/036556, Sep. 9, 2024, European Patent Office.

*Primary Examiner* — Daniel Cavallari
(74) *Attorney, Agent, or Firm* — Shumaker, Loop & Kendrick, LLP; Ryan Corbett

(57) ABSTRACT

A powered device (PD) interface controller is provided that includes a switch and control circuitry. The switch controls current to a PD from a power sourcing equipment (PSE). The PD accepts power from a network cable over which data is carried, and the PSE provides the power to the network cable. The PD also accepts power from an auxiliary power source. The control circuitry detects a change-over from the auxiliary power source to the PSE as a source of power. The control circuitry turns on the switch to control the current to a short circuit current limit level, greater than a startup inrush current limit of the PD, for a period of time less than a short circuit time limit, to charge a bulk capacitor of the PD. The control circuitry turns on the switch fully to allow the current to flow towards the PD.

18 Claims, 6 Drawing Sheets

POWERED DEVICE INTERFACE CONTROLLER

CROSS-REFERENCE TO RELATED APPLICATION(S)

The present application claims priority to U.S. Provisional Patent Application No. 63/525,815, entitled: Change-Over from Auxiliary Power in a Power over Ethernet System, filed on Jul. 10, 2023, the content of which is hereby incorporated by reference in its entirety.

TECHNOLOGICAL FIELD

The present disclosure relates generally to Power over Ethernet (POE) and, in particular, to implementing auxiliary power in a PoE system.

BACKGROUND

Power over Ethernet (POE) is a technology that allows electrical power and data to be transmitted over a standard Ethernet network cable. It eliminates the need for separate power cables, enabling devices to receive both power and network connectivity through a single Ethernet cable. There are different versions of PoE. IEEE 802.3af is the original PoE standard. IEEE 802.3at is a newer standard that provides higher power delivery than IEEE 802.3af. IEEE 802.3bt is the latest standard and can deliver even higher power levels.

With PoE, power can be supplied to devices such as Internet Protocol (IP) cameras, wireless access points, Voice over IP (VOIP) phones, and other networked devices directly through the Ethernet infrastructure. This simplifies the installation and deployment of these devices, especially in situations where power outlets may not be readily available.

PoE operates by using wires in the Ethernet cable to deliver electrical power alongside the data signals. This is accomplished by injecting power into the cable at power sourcing equipment (PSE), which can be located at a PoE-enabled switch or a PoE midspan injector. The power is then extracted at a powered device (PD) interface located at the PD receiving power and data. The PD may include a power converter, typically a DC-DC converter, to convert received power from the PD interface to an appropriate voltage level for the PD; and the PD may include a bulk capacitor to smooth out voltage ripples or fluctuations caused by variations at the input of the power converter.

Many PoE applications also employ auxiliary power sources, such as an AC-powered wall adapter (WA), connected to the PD. In these applications, the auxiliary power may supplement or replace the power delivered over Ethernet. PoE may then provide redundancy and backup power for the PD.

BRIEF SUMMARY

In many PoE systems, the PD does not draw appreciable power from the PSE when an auxiliary power source is connected to the PD. Similarly, the PD draws power from the PSE when the auxiliary power source is disconnected from the PD. These operations may be accomplished with a switch at the PD, such as a transistor in series with the power path from the PSE to the PD. When the auxiliary power source is connected, the switch may not immediately disconnect the PD from drawing appreciable power from the PSE, to allow for a seamless change-over from the PSE to the auxiliary power source as a source of power for the PD. A seamless change-over from the auxiliary power source to the PSE is also beneficial, and in this case the switch may need to be turned on more quickly to avoid voltage at the PD decreasing below an under-voltage lockout (UVLO) level.

A seamless change-over to the PSE from the auxiliary power source may be accomplished by continuous operation of the power converter of the PD. In cases in which the auxiliary power source voltage is higher than the PSE voltage, the bulk capacitor of the PD may simply discharge until it reaches the PSE voltage. In other cases, however, the auxiliary power source voltage is lower than the PSE voltage. In these other cases, the bulk capacitor may need to be charged up to the PSE voltage. In many PoE systems, the PD charges the bulk capacitor during an inrush stage by controlling a switch of the PD interface to control current from the PSE to the PD to a startup inrush current limit of the PD (e.g., up to 400 mA). But when the auxiliary power source voltage is lower than the PSE voltage, the PD may go into inrush mode, i.e., switch to the inrush stage, to charge the bulk capacitor when the auxiliary power source is disconnected. In the inrush stage, the PD may use the startup inrush current limit, but if the power converter current is larger than the startup inrush current limit, the bulk capacitor may discharge and cause the power converter to turn off. This may be the case for type 3 and type 4 PoE, which allow for power delivery of up to respectively 60 watts and 90 watts, where the power converter current may be up to 1.93 A. The switch and the control circuitry of the PD interface, together, may be termed a PD interface controller.

Example implementations of the present disclosure are directed to implementing auxiliary power in a PoE system. In accordance with example implementations, on change-over from an auxiliary power source to PSE as a source of power, e.g., when the auxiliary power source ceasing supplying power to the PD, the PD interface may control current to the PD from the PSE to a short circuit current limit level (e.g., 2.3-2.5 A), for a period of time less than a short circuit time limit. The present disclosure includes, without limitation, the following example implementations.

Some example implementations provide a powered device interface controller comprising: a switch to control current to a powered device from a power sourcing equipment providing power to the powered device over a network cable, the powered device to also accept power from an auxiliary power source; and control circuitry to at least: detect a change-over from the auxiliary power source to the power sourcing equipment as a source of power for the powered device; at least partially responsive to detection of the change-over from the auxiliary power source to the power sourcing equipment as the source of power for the powered device, control the switch to control the current to the powered device from the power sourcing equipment to a short circuit current limit level for a period of time less than a short circuit time limit, to charge a bulk capacitor of the powered device, which short circuit current limit is greater than a startup inrush current limit of the powered device; and subsequent to the control of the switch to control the current to the powered device from the power sourcing equipment to the short circuit current limit level for the period of time less than a short circuit time limit, turn on the switch fully to allow the current from the power sourcing equipment to flow towards the powered device.

Some example implementations provide a powered device comprising: a power converter to provide a controlled voltage to a load from a source of power, the powered device to accept power from a power sourcing equipment providing power to the powered device over a network cable, the powered device to also accept power from an auxiliary power source; a bulk capacitor coupled to an input of the power converter; and a powered device interface controller to control current to the powered device from the power sourcing equipment, including the powered device interface controller to at least: detect a change-over from the auxiliary power source to the power sourcing equipment as the source of power for the powered device; at least partially responsive to detection of the change-over from the auxiliary power source to the power sourcing equipment as the source of power for the powered device, control the current to a short circuit current limit level for a period of time less than a short circuit time limit, to charge the bulk capacitor, which short circuit current limit is greater than a startup inrush current limit of the powered device; and subsequent to the control of the current to the short circuit current limit level for the period of time less than the short circuit time limit, allow the current from the power sourcing equipment to flow freely towards the powered device.

Some example implementations provide a method comprising: detecting a change-over from an auxiliary power source to a power sourcing equipment as a source of power for a powered device in a Power over Ethernet system; at least partially responsive to detecting the change-over from the auxiliary power source to the power sourcing equipment as the source of power for the powered device, controlling current to the powered device from the power sourcing equipment to a short circuit current limit level for a period of time less than a short circuit time limit, to charge a bulk capacitor of the powered device, which short circuit current limit is greater than a startup inrush current limit of the powered device; and subsequent to the controlling of the current to the powered device from the power sourcing equipment to the short circuit current limit level for the period of time less than a short circuit time limit, allowing the current from the power sourcing equipment to flow freely towards the powered device.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
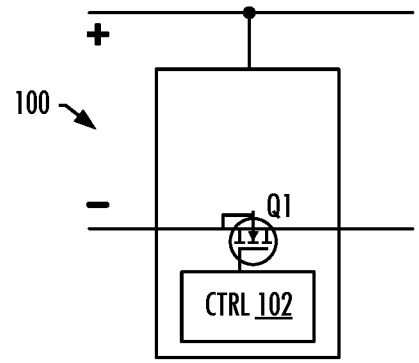
FIG. 1 illustrates a powered device (PD) interface controller, according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

The present disclosure relates generally to Power over Ethernet (POE) and, in particular, to implementing auxiliary power in a PoE system that includes a power sourcing equipment (PSE), a powered device (PD), and an Ethernet cable over which data is carried. The PoE system may also include a PD interface controller to manage power delivery to the PD.

FIG. 1 illustrates a powered device (PD) interface controller 100, according to some example implementations of the present disclosure. The PD interface controller is an electronic device such as an integrated circuit (IC) with one or more electronic circuits including transistors and other electronic components. As shown, the PD interface controller includes a switch Q1 and control circuitry 102. In some examples, the switch is a transistor, such as a field-effect transistor (FET), which may be placed in series with the power path from the PSE to the PD. The switch Q1 may be controlled by the control circuitry 102 to control current to the PD from the PSE; and in some examples in which the switch is a transistor, the control circuitry 102 may include gate control circuitry. PD interface controller 100 is illustrated with switch Q1 as part of an integrated circuit including control circuitry 102, however this is not meant to be limiting in any way. In other examples, switch Q1 is provided externally from the integrated circuit including control circuitry 102.

Figure 2:
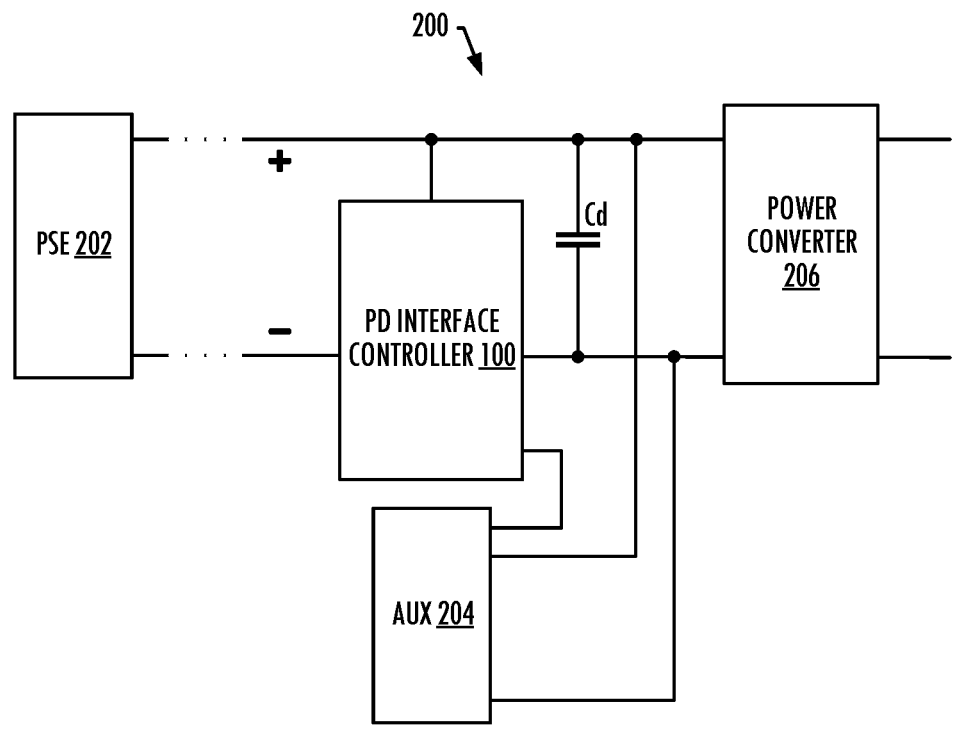
FIG. 2 illustrates a PD portion including the PD interface controller of FIG. 1, according to some example implementations.
Figure 3:
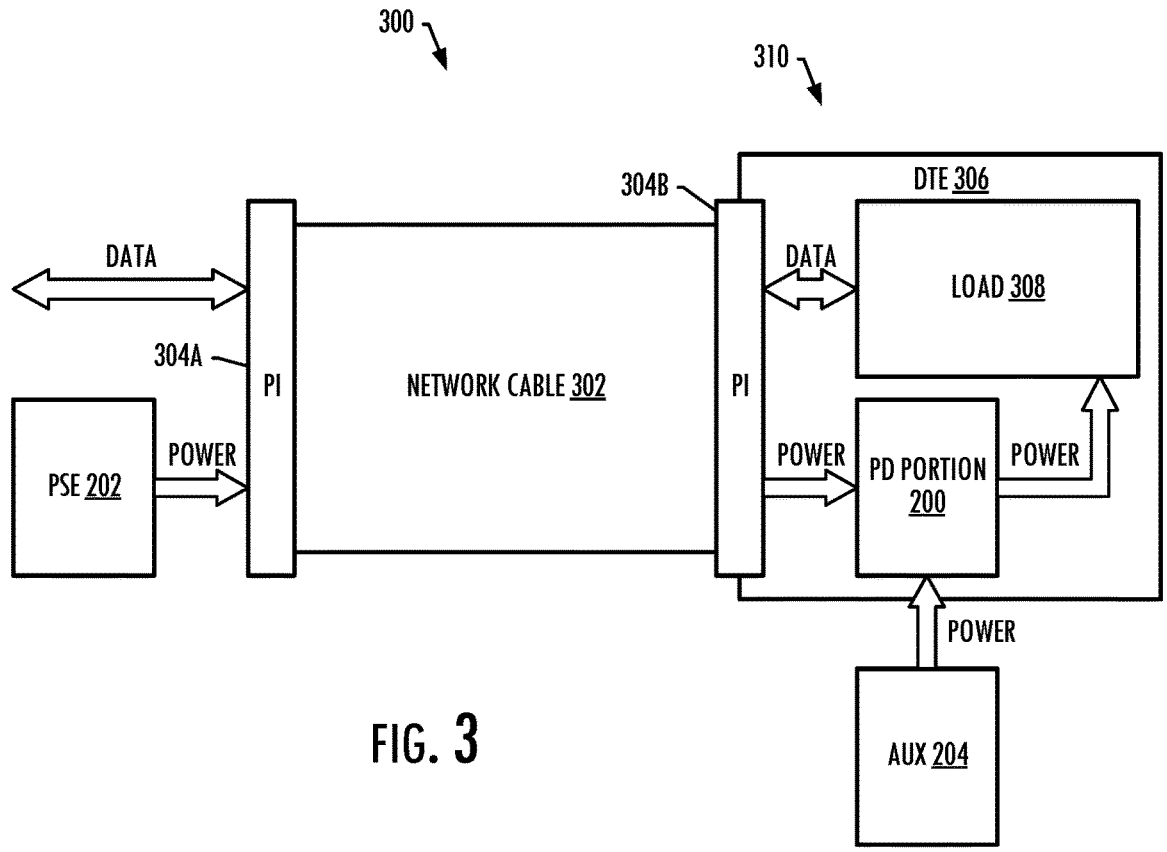
FIG. 3 illustrates a Power over Ethernet (POE) system including the PD portion of FIG. 2, according to some example implementations of the present disclosure.

FIG. 2 illustrates a PD portion 200 including the PD interface controller 100 of FIG. 1, and FIG. 3 illustrates a Power over Ethernet (POE) system 300 including the PD portion 200 of FIG. 2, according to some example implementations, FIGS. 2 and 3 being described together. As shown, the PD portion 200 is connected to a PSE 202 in the PoE system by a network cable 302, such as an Ethernet cable, over which data and power is carried. The PSE 202 provides power to the network cable 302, such as to a first power interface (PI) 304A of the network cable, such as an Ethernet (e.g., RJ-45) connector. The PD portion 200 accepts the power from the network cable 302, such as from a second PI 304B of the network cable.

The PD portion 200 may also accept power from an auxiliary power source 204, such as an AC-powered wall adapter (WA). The auxiliary power source may supplement or replace the power delivered over the network cable 302 from the PSE 202. Similarly, the power delivered over the network cable 302 from the PSE 202 may provide redundancy and backup power for the PD in the event that power is unavailable from auxiliary power source 204. The auxiliary power source 204 may be connected to the PD in a number of different configurations. As shown in FIG. 2, for example, the auxiliary power source is connected to the PD portion 200 in what is at times referred to as a "Rear Aux" or "RAUX" configuration in which the auxiliary power source 204 is connected between the PD interface controller 100 and the power converter 206. In other examples, the auxiliary power source may be connected to the PD in a "Front Aux" or "FAUX" configuration in which the auxiliary power source 204 is connected before the PD interface controller 100. The description herein is primarily detailed in relation to the RAUX configuration, however it is equally applicable, with changes that will be understood by those skilled in the art, to the FAUX configuration.

In various examples, the PSE 202 may be located at a PoE-enabled switch or a PoE midspan injector. Likewise, the PD portion 200 may be located at a data terminal equipment (DTE) 306, such as an IP camera, wireless access point, VOIP phone or other networked device. In this regard, the power accepted by the PD (from the network cable 302 or auxiliary power source 204) may be consumed by a load 308 to perform one or more intended functions of the DTE. Examples of suitable intended functions include surveillance, data communication, wireless networking, or telephony. The combination of second PI 304B, PD portion 200, and load 308 may be considered a powered device (PD) 310.

In FIG. 2, the PD portion 200 includes the PD interface controller 100, a power converter 206, and a bulk capacitor Cd. As indicated above, the PD interface controller 100 may perform one or more functions to manage power delivery from the auxiliary power source 204 and the PSE 202 and the PD. The PD portion 200 and the PSE 202 may perform a handshake procedure when the PD portion 200 is connected to the PSE over the network cable 302. The PSE 202 may perform a detection operation to determine if the PD portion 200 is PoE-compatible, and a classification operation to determine power requirements of the DTE 306 (as shown in FIG. 3). In particular, for example, the PD interface controller 100 may communicate with the PSE 202 to negotiate and determine an amount of power that can be provided by the PSE 202 to the DTE 306, and in particular to the load 308, considering power requirements of the DTE 306 and capabilities of the PSE 202. In operation, then, the PD interface controller 100 may control the switch Q1 to control current to the PD portion 200, and thereby control current to the DTE 306 from the PSE 202, which current to the DTE 306 from the PSE 202 may be referenced as $I_{PD}$. The term "control current" as used herein, is meant to be understood as to maintain an isolation switch in the fully closed position when current is appreciably below a predetermined current limit ($I_{LIM}$), and generally limit the current so as not to exceed $I_{LIM}$, such as in a case of overload or short circuit, without limitation.

The power converter 206, typically a DC-DC converter, may convert received power from a source of power, such as the PSE 202 or the auxiliary power source 204, to an appropriate voltage level for the DTE 306 (load 308). The power converter 206 may therefore provide a controlled voltage to the load 308 from the source of power, such as the PSE 202 or the auxiliary power source 204. The bulk capacitor Cd may be coupled to an input of the power converter 206. A bulk capacitor, also known as a filter capacitor or smoothing capacitor, is an electronic component that is used in power supply circuits to smooth input voltage of power converters. A bulk capacitor stores electrical energy for release on the waveform's downward trend and moderates the voltage level by reducing peaks. In this regard, the bulk capacitor Cd may stabilize the input voltage by smoothing out voltage ripples or fluctuations caused by short term variations in the input voltage of the power converter 206. The bulk capacitor Cd may also stabilize the input voltage of the power converter 206 during change-over of the source of power, such as from the PSE 202 to the auxiliary power source 204, or from the auxiliary power source 204 to the PSE 202.

In some examples, during an inrush stage, when the PSE 202 is the source of power for the PD portion 200, the PD interface controller 100 may control $I_{PD}$ (current to the PD portion 200 from the PSE 202) to charge the bulk capacitor Cd. In this regard, the PD interface controller 100 may control $I_{PD}$ to a startup inrush current limit of the PD portion 200. The startup inrush current limit of the PD may at times be referenced as $I_{INRUSH}$. Subsequent to the control of $I_{PD}$ from the PSE 202 to $I_{INRUSH}$ to charge the bulk capacitor Cd, when the bulk capacitor Cd is charged to a predetermined under voltage lockout (UVLO) limit, the PD interface controller 100 may turn on the power converter 206, and allow $I_{PD}$ from the PSE 202 to flow freely towards the PD, in other words fully turn on switch Q1, as long $I_{PD}$ remains appreciably below $I_{LIM}$. This may be an operational level of current for the DTE 306 to enable the load 308 to perform its one or more intended functions. The operational level of current may at times be referenced as $I_{DTE}$.

In some examples, the source of power for the PD portion 200 may change-over from the PSE 202 to the auxiliary power source 204, such as when the auxiliary power source 204 is connected to the PD portion 200. The PD interface controller 100, then, may detect a (first) change-over from the PSE 202 to the auxiliary power source 204 as the source of power for the PD portion 200. At least partially responsive to detection of the change-over from the PSE 202 to the auxiliary power source 204, the PD interface controller 100 may interrupt $I_{PD}$. This may effectively disconnect the PD from the PSE 202. In some examples, however, a small current (e.g., 10-16 mA) from the PSE 202 may be drawn to ensure that the PSE 202 does not disconnect the PD. This current may be referred to as a maintain power signature (MPS) current, and the current may be a DC current or a pulse current.

In some examples in which the source of power for the PD portion 200 is the auxiliary power source 204, the PD interface controller 100 may detect a (second) change-over from the auxiliary power source 204 to the PSE 202. In particular, for example, the PD interface controller 100 may detect a disconnection of the auxiliary power source 204 from the PD portion 200. At least partially responsive to detection of the change-over from the auxiliary power source 204 to the PSE 202, the PD interface controller 100 may control $I_{PD}$ to charge the bulk capacitor Cd. Instead of controlling $I_{PD}$ to $I_{INRUSH}$ (startup inrush current limit of the PD portion 200), as during the inrush stage, the PD interface controller 100 may control $I_{PD}$ to a short circuit current limit level, $I_{LIM}$, for a period of time less than a short circuit time limit, to charge the bulk capacitor Cd. Subsequent to the control of $I_{PD}$ to $I_{LIM}$ for the period of time less than the short circuit time limit, the PD interface controller 100 may allow the current from the PSE 202 to flow freely towards the PD portion 200, and from the PD portion 200 to the load 308 of the DTE 306 (as shown in FIG. 3) at the operational level $I_{DTE}$, i.e., the PD interface controller 100 may fully turn on switch Q1, while monitoring current flow.

In some examples, the short circuit current limit level is a short circuit current limit of the PSE 202, which may be a minimum short circuit current limit when the PSE specifies both a minimum and a maximum short circuit current limit. The short circuit current limit, which may be referenced as $I_{LIM}$, represents a maximum current the PSE can safely deliver under a short-circuit condition. In some cases in which the PD portion 200 continuously draws current of at least $I_{LIM}$, the PSE 202 may trigger a shutdown of a port to which the PD portion 200 is connected to safeguard the PSE 202 and the PoE system 300 from damage. In this regard, the PSE 202 may also specify a short circuit time limit, $T_{LIM}$, and trigger a shutdown of the port to which the PD portion 200 is connected if the PD portion 200 draws current of at least $I_{LIM}$ for a period of time of $T_{LIM}$. In some examples, then, the PD interface controller 100 may control $I_{PD}$ to $I_{LIM}$ for a period of time less than $T_{LIM}$, to avoid shutdown of the port to which the PD portion 200 is connected by PSE 202.

Figure 4:
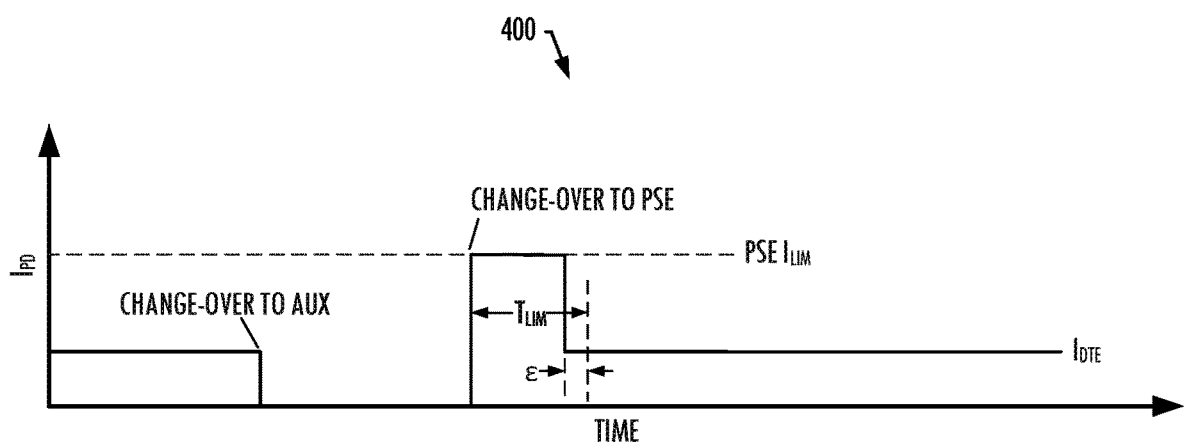
FIG. 4 is a graph of current flow to the PD from a power sourcing equipment (PSE) over a period of time, including a first change-over from the PSE to an auxiliary power source as a source of power for the PD, and a second change-over from the auxiliary power source to the PSE as the source of power, according to some example implementations.

FIG. 4 is a graph 400 of $I_{PD}$ (current to the PD portion 200 from the PSE 202) over a period of time, including a first change-over from the PSE 202 to the auxiliary power source 204 as a source of power for the PD portion 200, and a second change-over from the auxiliary power source 204 to the PSE 202 as the source of power for the PD portion 200, according to some example implementations. As shown, the PD interface controller 100 may allow $I_{PD}$ from the PSE 202 to flow freely at the operational level (i.e., $I_{DTE}$), i.e., the PD interface controller 100 may fully turn on switch Q1, until the PD interface controller 100 detects the first change-over. The PD interface controller 100, at least partially responsive to detection of the first change-over, may interrupt $I_{PD}$ to effectively disconnect the PD portion 200 from the PSE 202, as the auxiliary power source 204 provides power to the PD portion 200.

The PD interface controller 100 may continue to interrupt $I_{PD}$ as the auxiliary power source 204 provides power to the PD portion 200. Then at some later time, the PD interface controller 100 may detect the second change-over, from the auxiliary power source 204 to the PSE 202. At least partially responsive to detection of the second change-over, the PD interface controller 100 may control $I_{PD}$ to $I_{LIM}$ (short circuit current limit of the PSE 202) for a period of time less than $T_{LIM}$ (short circuit time limit of the PSE). As shown, this period of time may be represented as $T_{LIM}-\varepsilon$, where $\varepsilon$ represents a set amount of time by which the period of time is less than $T_{LIM}$. When $T_{LIM}=6$ ms and $\varepsilon=0.1$ ms, for example, the period of time that $I_{PD}$ is controlled to $I_{LIM}$ may be 5.9 ms. Subsequent to the control of $I_{PD}$ to $I_{LIM}$ for the period of time less than $T_{LIM}$, the PD interface controller may then control $I_{PD}$ to $I_{DTE}$, similar to before the first change-over.

Returning to FIGS. 1 and 2, in some examples, before the PD interface controller 100 controls $I_{PD}$ to the operational level (e.g., $I_{DTE}$) during change-over to the PSE 202, the PD interface controller 100 may determine whether the bulk capacitor Cd is sufficiently charged, if not fully charged. In some examples, then, the PD interface controller 100 may detect a charge level of the bulk capacitor is at least a threshold charge level, which may be determined as explained in greater detail below.

In other examples, the PD interface controller 100 may detect the charge level of the bulk capacitor Cd is below the threshold charge level. In these other examples, at least partially responsive to detection that the charge level of the bulk capacitor Cd is below the threshold charge level, the PD interface controller 100 may turn off the power converter 206. Subsequent to the turn off the power converter 206, the PD interface controller 100 may control $I_{PD}$ to $I_{INRUSH}$ (the startup inrush current limit of the PD 200) to charge the bulk capacitor to at least the threshold charge level. The PD interface controller 100 may monitor the charge level, detect the charge level of the bulk capacitor is at least the threshold charge level, and at least partially in response to the detecting that the charge level of the bulk capacitor is at least the threshold charge level, turn on the power converter.

As shown in FIG. 1, for example, the control circuitry 102 of the PD interface controller 100 may control the switch Q1 to control $I_{PD}$ in a number of different manners. In some examples in which the switch is a transistor, the control circuitry may derive a control signal that determines a state of the transistor. In one state of the control signal, the switch Q1 may not conduct (OFF state), creating a high-resistance on the power path from the PSE 202 to the PD portion 200. The control signal may provide a second state, wherein the switch Q1 may be partially conducting (partially ON state) and the control signal may provide a third state whether the switch Q1 is fully conducting (ON state). In the ON state, the switch Q1 creates a low resistance on the power path from the PSE to the PD. In the partially ON state, to control $I_{PD}$, the control signal may partially turn on the switch Q1, varying the effective resistance of the transistor, and thereby varying $I_{PD}$.

In some examples, the PSE 202 may be the source of power for the PD portion 200 during the inrush stage. In some of these examples, the control circuitry 102 may turn on the switch Q1 to control $I_{PD}$ to $I_{INRUSH}$ to charge the bulk capacitor Cd. Subsequent to turning on the switch Q1, the control circuitry 102 may operate the switch to allow $I_{PD}$ from the PSE 202 to flow freely at $I_{DTE}$, i.e., the control circuitry 102 may fully turn on switch Q1, while monitoring the current flow. The control circuitry 102 may later detect a (first) change-over from the PSE 202 to the auxiliary power source 204 as the source of power for the PD portion 200, and at least partially responsive to detection of the change-over from the PSE 202 to the auxiliary power source 204, turn off the switch Q1 to interrupt $I_{PD}$.

In some examples in which the auxiliary power source 204 is the source of power for the PD portion 200, the control circuitry 102 may detect a (second) change-over from the auxiliary power source 204 to the PSE 202 as the source of power for the PD portion 200. At least partially responsive to detection of the change-over from the auxiliary power source 204 to the PSE 202, the control circuitry 102 may turn on the switch Q1 to control $I_{PD}$ to a short circuit current limit level that is greater than $I_{INRUSH}$ to charge the bulk capacitor Cd. As described above, this short circuit current limit level may be $I_{LIM}$ (short circuit current limit of the PSE), and the control circuitry 102 may control $I_{PD}$ to that level for a period of time less than $T_{LIM}$ (short circuit time limit of the PSE). Subsequent to the control of $I_{PD}$ to $I_{INRUSH}$, the control circuitry 102 may operate the switch Q1 to allow $I_{PD}$ from the PSE 202 to flow freely at the operational level (e.g., $I_{DTE}$) i.e., the control circuitry 102 may fully turn on switch Q1, while monitoring the current flow.

Before the switch Q1 is operated to control $I_{PD}$ to $I_{DTE}$, in some examples, the control circuitry 102 may determine whether the bulk capacitor Cd is sufficiently charged, if not fully charged, which may be the case when the charge level of the bulk capacitor Cd is at least the threshold charge. The charge level of the bulk capacitor may be detected, and the threshold charge level may be determined, in a number of different manners. In some examples, the charge level of the bulk capacitor may be detected by detecting a voltage across the switch Q1. When the switch Q1 is a transistor, this voltage may be the drain-source voltage, referenced as $V_{DS}$. In some of these examples, the threshold voltage may be determined based on an on-resistance of the transistor, such as a specific on-resistance of the transistor, $R_{DS(on)}$, and current to the power converter, $I_{DC-DC}$. In a more particular example, the threshold voltage may be expressed as the product of $R_{DS(on)}$ and $I_{DC-DC}$ (i.e., $R_{DS(on)} \times I_{DC-DC}$), and the charge level of the bulk capacitor may be at least the threshold voltage when $V_{DS} \leq (R_{DS(on)} \times I_{DC-DC})$.

When the control circuitry 102 detects the charge level of the bulk capacitor Cd is below the threshold charge level after the period where control circuitry 102 turned on the switch Q1 to control $I_{PD}$ to the short circuit current limit level that is greater than $I_{INRUSH}$, the control circuitry may turn off the power converter 206, at least partially responsive to detection that the charge level of the bulk capacitor Cd is below the threshold charge level. The control circuitry may operate the switch Q1 to control $I_{PD}$ to $I_{INRUSH}$ to charge the bulk capacitor Cd. The control circuitry 102 may monitor the charge level of the bulk capacitor Cd, detect the charge level is at least the threshold charge level, and at least partially in response to detecting the charge level is at least the threshold charge level, turn on the power converter 206.

Figure 5:
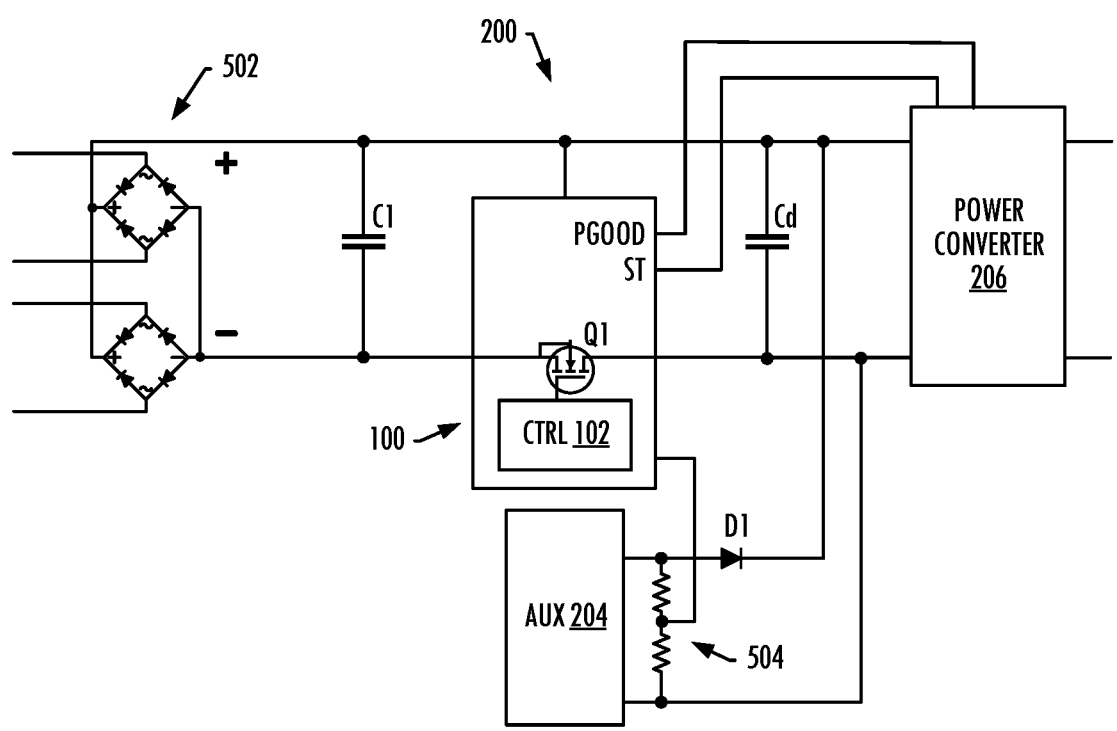
FIG. 5 illustrates the PD portion of FIG. 2, including with particularity the PD interface controller of FIG. 1, and further including a pair of rectifiers, according to some example implementations.

To further illustrate example implementations of the present disclosure, FIG. 5 illustrates the PD portion 200 of FIG. 2, including with particularity the PD interface controller 100 of FIG. 1, and further including a pair of rectifiers 502, according to some example implementations. In the PoE system 300 of FIG. 3, the pair of rectifiers 502 may be coupled to the second PI 304B to provide polarity correction for the power delivered over the network cable 302 from the PSE 202. In this regard, the pair of rectifiers 502 may convert an input voltage of either of two polarities to an output voltage of one of the two polarities. The PD portion 200 also includes an input capacitor C1, which may be used in signature detection during the detection operation in which the PD determines if the PD is PoE-compatible.

In some examples, the control circuitry 102 of the PD interface controller 100 may determine connection or disconnection of the auxiliary power source 204 from the PD portion 200 by detecting the presence of an upper supply rail of the auxiliary power source 204. In some of these examples, as shown, the PD portion 200 may include a voltage divider circuit 504 to reduce the upper supply rail of the auxiliary power source to a voltage level that can be detected by the PD interface controller 100. The PD portion 200 may further include an OR-ing diode, shown as a high-side OR-ing diode D1, which may prevent a backflow of power to the auxiliary power source 204 when the PD portion 200 is powered from the PSE 202.

As also shown in FIG. 5, in examples in which the PD interface controller 100 detects the charge level of the bulk capacitor Cd is below the threshold charge level (during change-over from the auxiliary power source 204 to the PSE 202), the PD interface controller 100 may de-assert a Power GOOD (PGOOD) signal to turn off the power converter 206, and control $I_{PD}$ to the startup inrush level to charge the bulk capacitor Cd. In some examples, based on the status of an ST signal from the PD interface controller 100, the power converter 206 may temporarily decrease power consumption. In this regard, the ST signal may be a communication signal to notify the power converter 206 when the auxiliary power source 204 is connected or disconnected. The PD interface controller 100 may monitor the charge level of bulk capacitor Cd, detect the charge level of the bulk capacitor Cd is at least the threshold charge level, and assert the PGOOD signal to turn on the power converter.

FIGS. 6A, 6B, 6C, 6D and 6E are flowcharts illustrating various steps in a method 600 according to some example implementations. The method includes detecting a change-over from an auxiliary power source to a power sourcing equipment as a source of power for a powered device in a Power over Ethernet system, as shown at block 602 of FIG. 6A. The method includes, at least partially responsive to detecting the change-over from the auxiliary power source to the power sourcing equipment as the source of power for the powered device, controlling current to the powered device from the power sourcing equipment to a short circuit current limit level for a period of time less than a short circuit time limit, which short circuit current limit level is greater than a startup inrush current limit of the powered device, to charge a bulk capacitor of the powered device, as shown at block 604. The method includes, subsequent to the controlling of the current to the powered device from the power sourcing equipment to the short circuit current limit level for the period of time less than the short circuit time limit, allowing the current from the power sourcing equipment to flow freely towards the powered device, as shown at block 606, e.g., by fully turning on an inline switch, such as Q1.

Figure 6A:
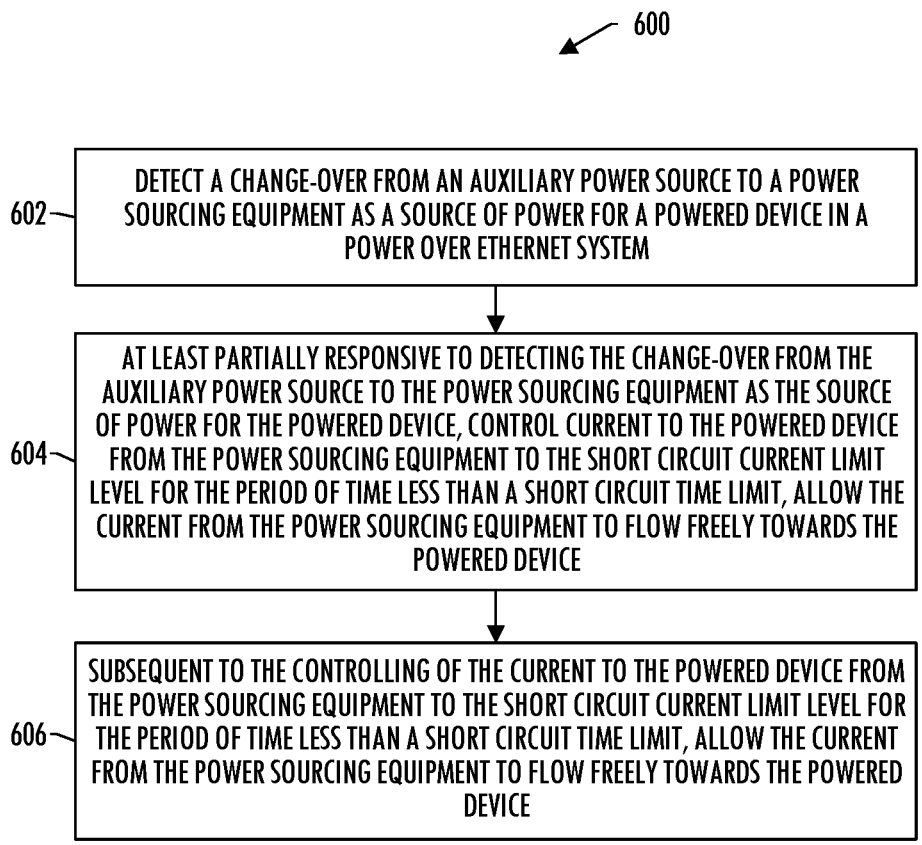
FIGS. 6A, 6B, 6C, 6D and 6E are flowcharts illustrating various operations in a method, according to some example implementations.
Figure 6B:
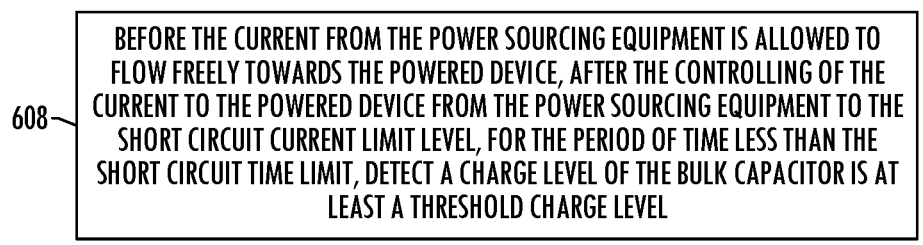

In some examples, before the current from the power sourcing equipment is allowed to flow freely towards the powered device at block 606, after the controlling of the current to the powered device from the power sourcing equipment to the short circuit current limit level, for the period of time less than the short circuit time limit, the method 600 includes detecting a charge level of the bulk capacitor is at least a threshold charge level, as shown at block 608 of FIG. 6B.

Figure 6C:
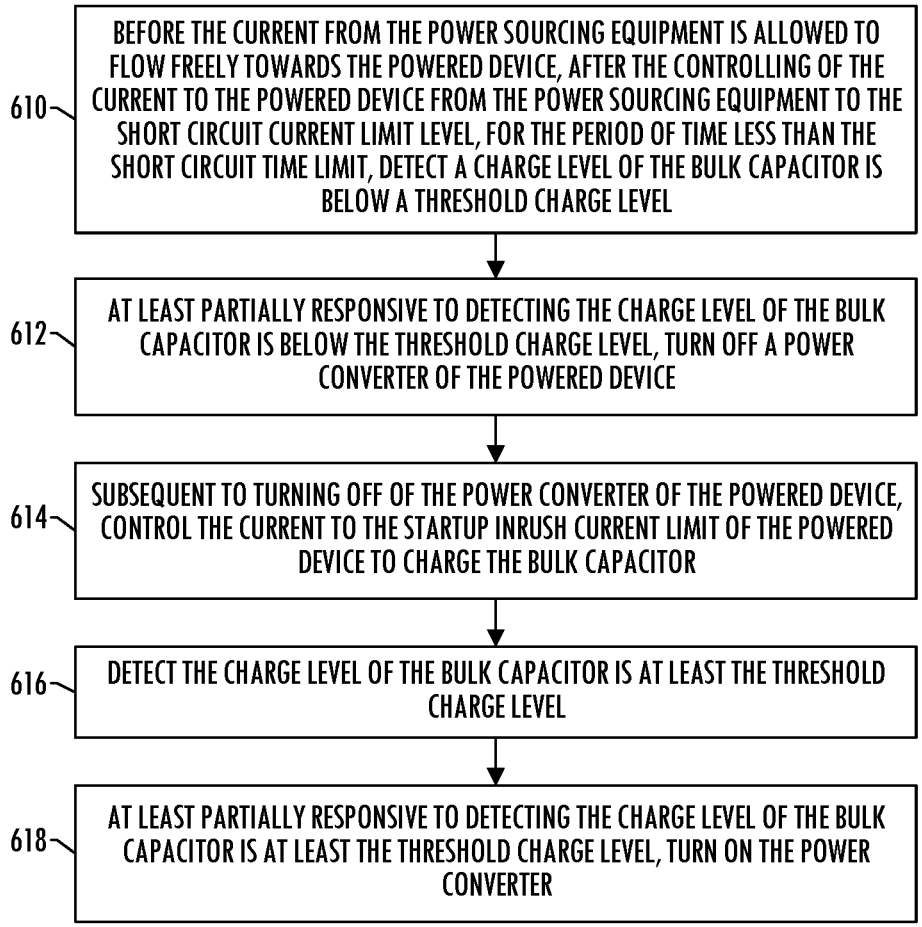

In some examples, before the current from the power sourcing equipment is allowed to flow freely towards the powered device at block 606, after the controlling of the current to the powered device from the power sourcing equipment to the short circuit current limit level, for the period of time less than the short circuit time limit, the method 600 includes detecting a charge level of the bulk capacitor is below a threshold charge level, as shown at block 610 of FIG. 6C. In some of these examples, the method includes, at least partially responsive to detecting the charge level of the bulk capacitor is below the threshold charge level, turning off a power converter of the powered device, as shown at block 612. The method includes, subsequent to turning off the power converter of the powered device, controlling the current to a startup inrush current limit of the powered device, to charge the bulk capacitor, as shown at block 614. The method includes detecting the charge level of the bulk capacitor is at least the threshold charge level, as shown at block 616. The method includes, at least partially responsive to detecting the charge level of the bulk capacitor is at least the threshold charge level, turning on the power converter, as shown at block 618.

Figure 6D:
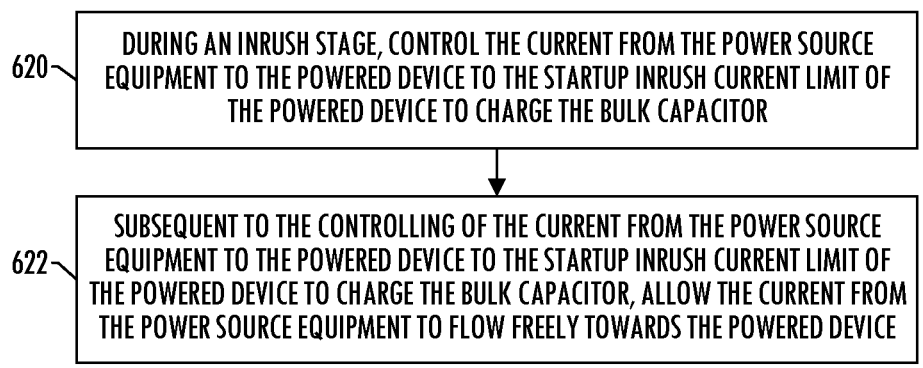

In some examples, during an inrush stage, the method 600 includes controlling the current to the startup inrush current limit of the powered device, to charge the bulk capacitor, as shown at block 620 of FIG. 6D. In some of these examples, the method includes, subsequent to the controlling of the current from the power sourcing equipment to the powered device to the startup inrush current limit of the powered device, allowing the current from the power sourcing equipment to flow freely towards the powered device, as shown at block 622, e.g., by fully turning on an inline switch, such as Q1.

Figure 6E:
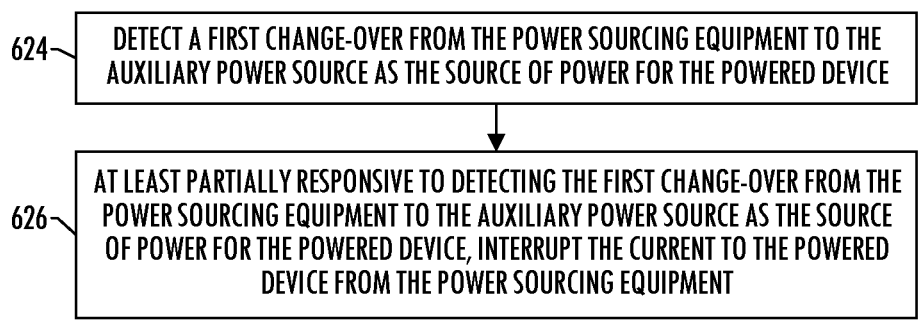

In some examples, the change-over is a second change-over, and the method 600 includes detecting a first change-over from the power sourcing equipment to the auxiliary power source as the source of power for the powered device, as shown at block 624 of FIG. 6E. In some of these examples, the method includes, at least partially responsive to detecting the first change-over from the power sourcing equipment to the auxiliary power source as the source of power for the powered device, interrupting the current to the powered device from the power sourcing equipment, as shown at block 626.

As explained above and reiterated below, the present disclosure includes, without limitation, the following example implementations.

Clause 1. A powered device interface controller comprising: a switch to control current to a powered device from a power sourcing equipment providing power to the powered device over a network cable, the powered device to also accept power from an auxiliary power source; and control circuitry to at least: detect a change-over from the auxiliary power source to the power sourcing equipment as a source of power for the powered device; at least partially responsive to detection of the change-over from the auxiliary power source to the power sourcing equipment as the source of power for the powered device, control the switch to control the current to the powered device from the power sourcing equipment to a short circuit current limit level for a period of time less than a short circuit time limit, to charge a bulk capacitor of the powered device, which short circuit current limit is greater than a startup inrush current limit of the powered device; and subsequent to the control of the switch to control the current to the powered device from the power sourcing equipment to the short circuit current limit level for the period of time less than a short circuit time limit, turn on the switch fully to allow the current from the power sourcing equipment to flow towards the powered device.

Clause 2. The powered device interface controller of clause 1, wherein before the switch is turned on fully to allow the current from the power sourcing equipment to flow towards the powered device, after the control of the current to the powered device from the power sourcing equipment to the short circuit current limit level, for the period of time less than a short circuit time limit, the control circuitry to detect a charge level of the bulk capacitor is at least a threshold charge level.

Clause 3. The powered device interface controller of clause 2, wherein the control circuitry to detect the charge level of the bulk capacitor is at least the threshold charge level, responsive to a measurement of a voltage drop across the switch.

Clause 4. The powered device interface controller of any of clauses 1 to 3, wherein before the switch is turned on fully to allow the current from the power sourcing equipment to flow towards the powered device, after the control of the current to the powered device from the power sourcing equipment to the short circuit current limit level, for the period of time less than a short circuit time limit, the control circuitry to: detect a charge level of the bulk capacitor is below a threshold charge level; at least partially responsive to detection that the charge level of the bulk capacitor is below the threshold charge level, turn off a power converter of the powered device; subsequent to the turn off the power converter, operate the switch to control the current from the power sourcing equipment to the startup inrush current limit of the powered device to charge the bulk capacitor; detect the charge level of the bulk capacitor is at least the threshold charge level; and at least partially responsive to detection that the charge level of the bulk capacitor is at least the threshold charge level, turn on the power converter.

Clause 5. The powered device interface controller of any of clauses 1 to 4, wherein during an inrush stage, the control circuitry to: turn on the switch to control the current from the power sourcing equipment to the startup inrush current limit of the powered device to charge the bulk capacitor; and subsequent to the control of the current from the power sourcing equipment to the startup inrush current limit of the powered device to charge the bulk capacitor, turn on the switch fully to allow the current from the power sourcing equipment to flow from the power sourcing equipment towards the powered device.

Clause 6. The powered device interface controller of any of clauses 1 to 5, wherein the change-over is a second change-over, and the control circuitry to: detect a first change-over from the power sourcing equipment to the auxiliary power source as the source of power for the powered device; and at least partially responsive to detection of the first change-over from the power sourcing equipment to the auxiliary power source as the source of power for the powered device, turn off the switch to interrupt the current to the powered device from the power sourcing equipment.

Clause 7. A powered device comprising: a power converter to provide a controlled voltage to a load from a source of power, the powered device to accept power from a power sourcing equipment providing power to the powered device over a network cable, the powered device to also accept power from an auxiliary power source; a bulk capacitor coupled to an input of the power converter; and a powered device interface controller to control current to the powered device from the power sourcing equipment, including the powered device interface controller to at least: detect a change-over from the auxiliary power source to the power sourcing equipment as the source of power for the powered device; at least partially responsive to detection of the change-over from the auxiliary power source to the power sourcing equipment as the source of power for the powered device, control the current to a short circuit current limit level for a period of time less than a short circuit time limit, to charge the bulk capacitor, which short circuit current limit is greater than a startup inrush current limit of the powered device; and subsequent to the control of the current to the short circuit current limit level for the period of time less than the short circuit time limit, allow the current from the power sourcing equipment to flow freely towards the powered device.

Clause 8. The powered device of clause 7, wherein before the powered device interface controller to allow the current from the power sourcing equipment to flow freely towards the powered device, after the control of the current to the powered device from the power sourcing equipment to the short circuit current limit level, for the period of time less than a short circuit time limit, the powered device interface controller to detect a charge level of the bulk capacitor is at least a threshold charge level.

Clause 9. The powered device of clause 8, wherein the powered device interface controller to detect the charge level of the bulk capacitor is at least the threshold charge level, responsive to a measurement of a voltage drop across a switch.

Clause 10. The powered device of any of clauses 7 to 9, wherein before the powered device interface controller to allow the current from the power sourcing equipment to flow freely towards the powered device, after the control of the current to the powered device from the power sourcing equipment to the short circuit current limit level, for the period of time less than a short circuit time limit, the powered device interface controller to: detect a charge level of the bulk capacitor is below a threshold charge level; at least partially responsive to detection that the charge level of the bulk capacitor is below the threshold charge level, turn off the power converter of the powered device; subsequent to the turn off the power converter of the powered device, control the current from the power sourcing equipment to the startup inrush current limit of the powered device to charge the bulk capacitor; detect the charge level of the bulk capacitor is at least the threshold charge level; and at least partially responsive to detection that the charge level of the bulk capacitor is at least the threshold charge level, turn on the power converter.

Clause 11. The powered device of any of clauses 7 to 10, wherein during an inrush stage, the powered device interface controller to: control the current from the power sourcing equipment to the powered device to the startup inrush current limit of the powered device to charge the bulk capacitor; and subsequent to the control of the current from the power sourcing equipment to the powered device to the startup inrush current limit of the powered device to charge the bulk capacitor, allow the current from the power sourcing equipment to flow freely towards the powered device.

Clause 12. The powered device of any of clauses 7 to 11, wherein the change-over is a second change-over, and the powered device interface controller to: detect a first change-over from the power sourcing equipment to the auxiliary power source as the source of power for the powered device; and at least partially responsive to detection of the first change-over from the power sourcing equipment to the auxiliary power source as the source of power for the powered device, interrupt the current to the powered device from the power sourcing equipment.

Clause 13. A method comprising: detecting a change-over from an auxiliary power source to a power sourcing equipment as a source of power for a powered device in a Power over Ethernet system; at least partially responsive to detecting the change-over from the auxiliary power source to the power sourcing equipment as the source of power for the powered device, controlling current to the powered device from the power sourcing equipment to a short circuit current limit level for a period of time less than a short circuit time limit, to charge a bulk capacitor of the powered device, which short circuit current limit is greater than a startup inrush current limit of the powered device; and subsequent to the controlling of the current to the powered device from the power sourcing equipment to the short circuit current limit level for the period of time less than a short circuit time limit, allowing the current from the power sourcing equipment to flow freely towards the powered device.

Clause 14. The method of clause 13, wherein before the current from the power sourcing equipment is allowed to flow freely towards the powered device, after the controlling of the current to the powered device from the power sourcing equipment to the short circuit current limit level, for the period of time less than a short circuit time limit, the method comprises detecting a charge level of the bulk capacitor is at least a threshold charge level.

Clause 15. The method of clause 14, wherein the charge level of the bulk capacitor is at least the threshold charge level is detected responsive to a measurement of a voltage drop across a switch.

Clause 16. The method of any of clauses 13 to 15, wherein before the current from the power sourcing equipment is allowed to flow freely towards the powered device, after the controlling of the current to the powered device from the power sourcing equipment to the short circuit current limit level, for the period of time less than a short circuit time limit, the method comprises: detecting a charge level of the bulk capacitor is below a threshold charge level; at least partially responsive to detecting the charge level of the bulk capacitor is below the threshold charge level, turning off a power converter of the powered device; subsequent to turning off the power converter of the powered device, controlling the current to the startup inrush current limit of the powered device to charge the bulk capacitor; detecting the charge level of the bulk capacitor is at least the threshold charge level; and at least partially responsive to detecting the charge level of the bulk capacitor is at least the threshold charge level, turning on the power converter.

Clause 17. The method of any of clauses 13 to 16, wherein during an inrush stage, the method comprises: controlling the current from the power source equipment to the powered device to the startup inrush current limit of the powered device to charge the bulk capacitor; and subsequent to the controlling of the current from the power source equipment to the powered device to the startup inrush current limit of the powered device to charge the bulk capacitor, allowing the current from the power source equipment to flow freely towards the powered device.

Clause 18. The method of any of clauses 13 to 17, wherein the change-over is a second change-over, and the method comprises: detecting a first change-over from the power sourcing equipment to the auxiliary power source as the source of power for the powered device; and at least partially responsive to detecting the first change-over from the power sourcing equipment to the auxiliary power source as the source of power for the powered device, interrupting the current to the powered device from the power sourcing equipment.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A powered device interface controller comprising:
a switch to control current to a powered device from a power sourcing equipment providing power to the powered device over a network cable, the powered device to also accept power from an auxiliary power source; and
control circuitry to at least:
detect a change-over from the auxiliary power source to the power sourcing equipment as a source of power for the powered device;
at least partially responsive to detection of the change-over from the auxiliary power source to the power sourcing equipment as the source of power for the powered device, control the switch to control the current to the powered device from the power sourcing equipment to a short circuit current limit for a period of time less than a short circuit time limit, to charge a bulk capacitor of the powered device, which short circuit current limit is greater than a startup inrush current limit of the powered device, wherein the short circuit current limit represents a maximum current the power sourcing equipment can deliver under a short-circuit condition and the short circuit time limit represents a duration that would trigger a shutdown of a port to which the powered device is connected if the powered device draws current of at least the short circuit current limit for the duration; and
subsequent to the control of the switch to control the current to the powered device from the power sourcing equipment to the short circuit current limit for the period of time less than a short circuit time limit, turn on the switch fully to allow the current from the power sourcing equipment to flow towards the powered device.

2. The powered device interface controller of claim 1, wherein before the switch is turned on fully to allow the current from the power sourcing equipment to flow towards the powered device, after the control of the current to the powered device from the power sourcing equipment to the short circuit current limit, for the period of time less than a short circuit time limit, the control circuitry to detect a charge level of the bulk capacitor is at least a threshold charge level.

3. The powered device interface controller of claim 2, wherein the control circuitry to detect the charge level of the bulk capacitor is at least the threshold charge level, responsive to a measurement of a voltage drop across the switch.

4. The powered device interface controller of claim 1, wherein before the switch is turned on fully to allow the current from the power sourcing equipment to flow towards the powered device, after the control of the current to the powered device from the power sourcing equipment to the short circuit current limit, for the period of time less than a short circuit time limit, the control circuitry to:
detect a charge level of the bulk capacitor is below a threshold charge level;
at least partially responsive to detection that the charge level of the bulk capacitor is below the threshold charge level, turn off a power converter of the powered device;
subsequent to the turn off the power converter, operate the switch to control the current from the power sourcing equipment to the startup inrush current limit of the powered device to charge the bulk capacitor;
detect the charge level of the bulk capacitor is at least the threshold charge level; and
at least partially responsive to detection that the charge level of the bulk capacitor is at least the threshold charge level, turn on the power converter.

5. The powered device interface controller of claim 1, wherein the control circuitry is further configured to:
turn on the switch to control the current from the power sourcing equipment to the startup inrush current limit of the powered device to charge the bulk capacitor; and
subsequent to the control of the current from the power sourcing equipment to the startup inrush current limit of the powered device to charge the bulk capacitor, turn on the switch fully to allow the current from the power sourcing equipment to flow from the power sourcing equipment towards the powered device.

6. The powered device interface controller of claim 1, wherein the change-over is a second change-over, and the control circuitry to:
detect a first change-over from the power sourcing equipment to the auxiliary power source as the source of power for the powered device; and
at least partially responsive to detection of the first change-over from the power sourcing equipment to the auxiliary power source as the source of power for the powered device, turn off the switch to interrupt the current to the powered device from the power sourcing equipment.

7. A powered device comprising:
a power converter to provide a controlled voltage to a load from a source of power, the powered device to accept power from a power sourcing equipment providing power to the powered device over a network cable, the powered device to also accept power from an auxiliary power source;

a bulk capacitor coupled to an input of the power converter; and a powered device interface controller to control current to the powered device from the power sourcing equipment, including the powered device interface controller to at least:

detect a change-over from the auxiliary power source to the power sourcing equipment as the source of power for the powered device;

at least partially responsive to detection of the change-over from the auxiliary power source to the power sourcing equipment as the source of power for the powered device, control the current to a short circuit current limit for a period of time less than a short circuit time limit, to charge the bulk capacitor, which short circuit current limit is greater than a startup inrush current limit of the powered device, wherein the short circuit current limit represents a maximum current the power sourcing equipment can deliver under a short-circuit condition and the short circuit time limit represents a duration that would trigger a shutdown of a port to which the powered device is connected if the powered device draws current of at least the short circuit current limit for the duration; and subsequent to the control of the current to the short circuit current limit for the period of time less than the short circuit time limit, allow the current from the power sourcing equipment to flow freely towards the powered device.

8. The powered device of claim 7, wherein before the powered device interface controller to allow the current from the power sourcing equipment to flow freely towards the powered device, after the control of the current to the powered device from the power sourcing equipment to the short circuit current limit, for the period of time less than a short circuit time limit, the powered device interface controller to detect a charge level of the bulk capacitor is at least a threshold charge level.

9. The powered device of claim 8, wherein the powered device interface controller to detect the charge level of the bulk capacitor is at least the threshold charge level, responsive to a measurement of a voltage drop across a switch.

10. The powered device of claim 7, wherein before the powered device interface controller to allow the current from the power sourcing equipment to flow freely towards the powered device, after the control of the current to the powered device from the power sourcing equipment to the short circuit current limit, for the period of time less than a short circuit time limit, the powered device interface controller to:

detect a charge level of the bulk capacitor is below a threshold charge level;

at least partially responsive to detection that the charge level of the bulk capacitor is below the threshold charge level, turn off the power converter of the powered device;

subsequent to the turn off the power converter of the powered device, control the current from the power sourcing equipment to the startup inrush current limit of the powered device to charge the bulk capacitor;

detect the charge level of the bulk capacitor is at least the threshold charge level; and at least partially responsive to detection that the charge level of the bulk capacitor is at least the threshold charge level, turn on the power converter.

11. The powered device of claim 7, wherein the powered device interface controller is further configured to:

control the current from the power sourcing equipment to the powered device to the startup inrush current limit of the powered device to charge the bulk capacitor; and subsequent to the control of the current from the power sourcing equipment to the powered device to the startup inrush current limit of the powered device to charge the bulk capacitor, allow the current from the power sourcing equipment to flow freely towards the powered device.

12. The powered device of claim 7, wherein the change-over is a second change-over, and the powered device interface controller to:

detect a first change-over from the power sourcing equipment to the auxiliary power source as the source of power for the powered device; and at least partially responsive to detection of the first change-over from the power sourcing equipment to the auxiliary power source as the source of power for the powered device, interrupt the current to the powered device from the power sourcing equipment.

13. A method comprising:

detecting a change-over from an auxiliary power source to a power sourcing equipment as a source of power for a powered device in a Power over Ethernet system;

at least partially responsive to detecting the change-over from the auxiliary power source to the power sourcing equipment as the source of power for the powered device, controlling current to the powered device from the power sourcing equipment to a short circuit current limit for a period of time less than a short circuit time limit, to charge a bulk capacitor of the powered device, which short circuit current limit is greater than a startup inrush current limit of the powered device, wherein the short circuit current limit represents a maximum current the power sourcing equipment can deliver under a short-circuit condition and the short circuit time limit represents a duration that would trigger a shutdown of a port to which the powered device is connected if the powered device draws current of at least the short circuit current limit for the duration; and subsequent to the controlling of the current to the powered device from the power sourcing equipment to the short circuit current limit for the period of time less than a short circuit time limit, allowing the current from the power sourcing equipment to flow freely towards the powered device.

14. The method of claim 13, wherein before the current from the power sourcing equipment is allowed to flow freely towards the powered device, after the controlling of the current to the powered device from the power sourcing equipment to the short circuit current limit, for the period of time less than a short circuit time limit, the method comprises detecting a charge level of the bulk capacitor is at least a threshold charge level.

15. The method of claim 14, wherein the charge level of the bulk capacitor is at least the threshold charge level is detected responsive to a measurement of a voltage drop across a switch.

16. The method of claim 13, wherein before the current from the power sourcing equipment is allowed to flow freely towards the powered device, after the controlling of the current to the powered device from the power sourcing equipment to the short circuit current limit, for the period of time less than a short circuit time limit, the method comprises:

detecting a charge level of the bulk capacitor is below a threshold charge level;

at least partially responsive to detecting the charge level of the bulk capacitor is below the threshold charge level, turning off a power converter of the powered device;

subsequent to turning off the power converter of the powered device, controlling the current to the startup inrush current limit of the powered device to charge the bulk capacitor;

detecting the charge level of the bulk capacitor is at least the threshold charge level; and at least partially responsive to detecting the charge level of the bulk capacitor is at least the threshold charge level, turning on the power converter.

17. The method of claim 13 further comprising:

controlling the current from the power source equipment to the powered device to the startup inrush current limit of the powered device to charge the bulk capacitor; and subsequent to the controlling of the current from the power source equipment to the powered device to the startup inrush current limit of the powered device to charge the bulk capacitor, allowing the current from the power source equipment to flow freely towards the powered device.

18. The method of claim 13, wherein the change-over is a second change-over, and the method comprises:

detecting a first change-over from the power sourcing equipment to the auxiliary power source as the source of power for the powered device; and at least partially responsive to detecting the first change-over from the power sourcing equipment to the auxiliary power source as the source of power for the powered device, interrupting the current to the powered device from the power sourcing equipment.

* * * * *